United States Patent
Beverley et al.

(10) Patent No.: US 7,334,306 B2
(45) Date of Patent: Feb. 26, 2008

(54) METHODS AND APPARATUS FOR FABRICATING A TURBINE NOZZLE ASSEMBLY

(75) Inventors: Michael Beverley, West Chester, OH (US); Leslie Eugene Leeke, Jr., Burlington, KY (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 10/859,381

(22) Filed: Jun. 2, 2004

(65) Prior Publication Data

US 2005/0268462 A1 Dec. 8, 2005

(51) Int. Cl.
*B23Q 1/00* (2006.01)
*B25B 27/14* (2006.01)

(52) U.S. Cl. ............... 29/281.1; 29/559; 29/889.7; 269/909

(58) Field of Classification Search ........... 29/281.1, 29/889.7, 557, 559, 464, 281.5; 269/909
See application file for complete search history.

(56) References Cited

U.S. PATENT DOCUMENTS

| | | | |
|---|---|---|---|
| 2,454,580 A | 11/1948 | Thielemann | |
| 3,566,068 A | 2/1971 | Bruner et al. | |
| 3,757,424 A | 9/1973 | Palmenberg | |
| 3,963,894 A | 6/1976 | Wachtell et al. | |
| 4,638,602 A | 1/1987 | Cavalieri | |
| 4,836,518 A | 6/1989 | Janutta | |
| 4,985,992 A | 1/1991 | Vosgien | |
| 5,132,502 A | 7/1992 | Caruana et al. | |
| 5,174,715 A | 12/1992 | Martin | |
| 6,250,620 B1 * | 6/2001 | Durfee, Jr. .................. | 269/43 |
| 6,652,369 B2 * | 11/2003 | Jones et al. .............. | 451/365 |
| 2003/0141284 A1 | 7/2003 | Varsell et al. | |
| 2005/0268461 A1 * | 12/2005 | Ouellette et al. .......... | 29/889.7 |
| 2005/0268462 A1 * | 12/2005 | Beverley et al. ......... | 29/889.21 |
| 2006/0059676 A1 * | 3/2006 | Jones et al. .................. | 29/464 |

FOREIGN PATENT DOCUMENTS

| | | |
|---|---|---|
| CH | 267456 | 6/1950 |
| EP | 1132166 A1 | 9/2001 |

OTHER PUBLICATIONS

International Search Report; Place of Search MUNICH; Dated Oct. 18, 2005; Reference 135827/10705; Application No. 05253081.3-2315; 4 Pgs.

* cited by examiner

*Primary Examiner*—Lee D Wilson
(74) *Attorney, Agent, or Firm*—William Scott Andes Armstrong Teasdale LLP

(57) ABSTRACT

An apparatus enables a turbine nozzle, including at least two turbine nozzle singlets to be fabricated. Each singlet includes inner and outer bands and a vane extending therebetween. The vane also includes first and second sidewalls coupled together at a leading edge and a trailing edge. The apparatus comprises a fixture, and at least two support members extending from the fixture. Each support member has first and second abutment surfaces, wherein a first of the at least two support members contacts at least one of the leading and trailing edges of a first of the vanes. At least two locating features extend from the fixture, wherein a first of the locating features contacts one of the first and second sidewalls of the first vane. At least two biasing members are coupled to the fixture, wherein a first of the biasing members biases the first vane against the first locating feature.

7 Claims, 5 Drawing Sheets

METHODS AND APPARATUS FOR FABRICATING A TURBINE NOZZLE ASSEMBLY

BACKGROUND OF THE INVENTION

This invention relates generally to gas turbine engines, and more particularly, to turbine nozzle assemblies for gas turbine engines.

Known gas turbine engines include combustors which ignite fuel-air mixtures that are channeled through a turbine nozzle assembly towards a turbine. At least some known turbine nozzle assemblies include a plurality of airfoil vanes that are coupled together such that the members are spaced apart. Within such nozzle assemblies, the airfoil vanes are coupled together by inner and outer band platforms which form a respective radially inner and outer flowpath boundaries. At least some known outer bands include a forward and an aft hook assembly that are used to couple the turbine nozzle within the engine.

Nozzle assemblies that include a plurality of airfoil vanes are generally more durable and experience less flow leakage in comparison to turbine nozzles including only one airfoil vane. Furthermore, such multi-vane turbine nozzles are generally cheaper to manufacture and assemble than turbine nozzles having only one airfoil vane. Because turbine nozzles may be subjected to high mechanical loads, at least some of such nozzle assemblies are assembled using brazing or welding operations. Specifically, the inner and outer band platforms are shaped using a grinder and are then brazed together to form the turbine nozzle assembly. However, because the grinding process may cause inconsistencies, accurately aligning the turbine nozzle vanes with respect to the turbine nozzle assembly may be difficult. For example, one member can be slightly angled with respect to the adjacent member, and such misalignment may cause variations in the throat areas between adjacent airfoil vanes which could adversely affect engine performance.

BRIEF DESCRIPTION OF THE INVENTION

In one aspect, a method is provided for fabricating a turbine nozzle. The turbine nozzle includes at least two turbine nozzle singlets, each turbine nozzle singlet includes an outer band, an inner band, and a vane extending between the outer and inner bands, and the vane includes a first sidewall and a second sidewall coupled together at a leading edge and a trailing edge. The method includes providing a fixture assembly that includes at least two support members extending from the fixture, at least two locating features extending from the fixture, and at least two biasing members coupled to the fixture. The method further includes positioning each turbine nozzle singlet in the fixture assembly such that at least one of each leading edge and each trailing edge is in contact with at least one support member, and such that at least one of each first sidewall and each second sidewall is in contact with one of the locating features, and securing each turbine nozzle singlet with respect to the fixture such that at least one biasing member biases each vane against one of the locating features.

In another aspect, an apparatus is provided for fabricating a turbine nozzle. The turbine nozzle includes at least two turbine nozzle singlets, each turbine nozzle singlet including an outer band, an inner band, and a vane extending therebetween, and the vane includes a first sidewall and a second sidewall coupled together at a leading edge and a trailing edge. The apparatus includes a fixture, and at least two support members extending from the fixture. Each support member has a first abutment surface and a second abutment surface, wherein a first of the at least two support members contact at least one of the trailing edge and the leading edge of a first of the turbine nozzle vanes. At least two locating features extend from the fixture, wherein a first of the locating features contacts one of the first sidewall and the second sidewall of the first turbine nozzle vane. At least two biasing members are coupled to the fixture, wherein a first of the biasing members biases the first turbine nozzle vane against the first locating feature.

In a further aspect, a datum system assembly is provided for use in fabricating a turbine nozzle. The turbine nozzle includes at least two turbine nozzle singlets that each include an outer band, an inner band, and a vane extending therebetween, and the vane includes a first sidewall and a second sidewall coupled together at a leading edge and a trailing edge. The datum system assembly includes a fixture, at least two rows of support members extending from the fixture, a first of the rows of support members for supporting a first of the turbine nozzle vanes, wherein the first row of support members is oriented substantially parallel to each other of the rows of support members. Each support member has a first abutment surface and a second abutment surface, wherein the first abutment surface and the second abutment surface contact at least one of the trailing edge and the leading edge. At least two locating features extend from the fixture, wherein a first of the locating features contacts one of the first sidewall and the second sidewall of the first turbine nozzle vane.

DETAILED DESCRIPTION OF THE INVENTION

As used herein, the terms "manufacture" and "manufacturing" may include any manufacturing process. For example, manufacturing processes may include grinding, finishing, polishing, cutting, machining, inspecting, and/or casting. The above examples are intended as exemplary only, and thus are not intended to limit in any way the definition and/or meaning of the terms "manufacture" and "manufacturing". In addition, as used herein the term "component" may include any object to which a manufacturing process is applied. Furthermore, although the invention is described herein in association with a gas turbine engine, and more specifically for use with a turbine nozzle assembly for a gas turbine engine, it should be understood that the present invention may be applicable to any component and/or any manufacturing process. Accordingly, practice of the present invention is not limited to the manufacture of turbine nozzle assemblies or other components of gas turbine engines.

Figure 1:
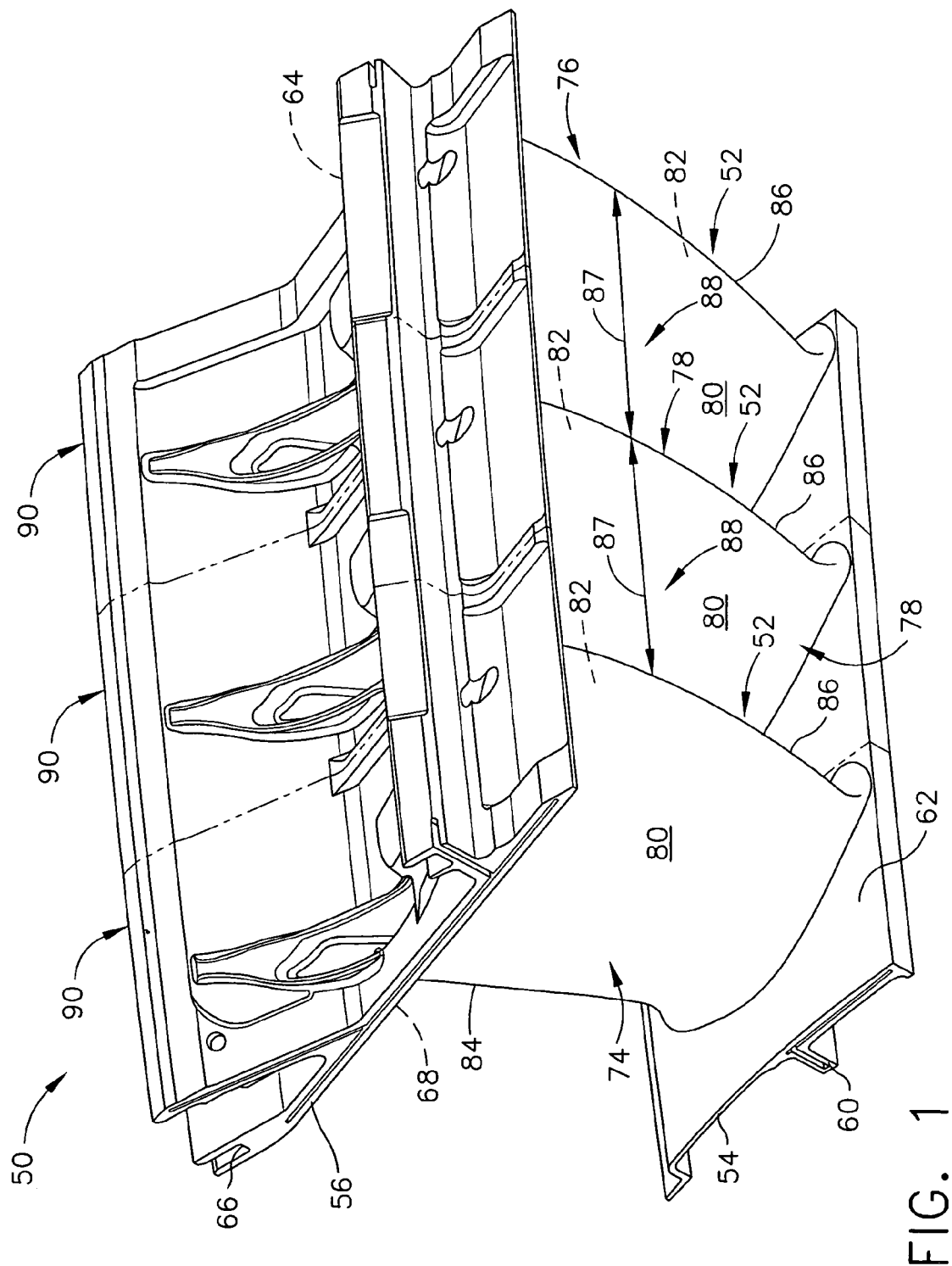
FIG. 1 is a perspective view of an exemplary turbine nozzle assembly that may be used in a gas turbine engine.

FIG. 1 is a perspective view of an exemplary known turbine nozzle assembly 50 that may be used with a gas turbine engine (not shown). In the exemplary embodiment, nozzle assembly 50 includes a plurality of turbine nozzle singlets 90 that are manufactured together to make a one piece nozzle assembly 50. Each singlet 90 includes an airfoil vane 52 coupled together by an arcuate radially inner band or platform 54, and an arcuate radially outer band or platform 56. In the exemplary embodiment, nozzle assembly 50 is fabricated from three singlets 50. Accordingly, nozzle assembly 50 includes three airfoil vanes 52. However, in an alternative embodiment, nozzle assembly 50 includes two singlets 90, forming a doublet.

Inner band 54 includes a retention flange 60 that extends radially inwardly therefrom. More specifically, flange 60 extends substantially perpendicularly from band 54 with respect to a radially outer surface 62 of flange 60. Outer band 56 also includes a retention flange 64 that extends radially outwardly therefrom, and a leading edge hook assembly 66 that also extends radially outwardly therefrom. More specifically, outer band retention flange 64 and leading edge hook assembly 66 extend substantially perpendicularly from band 56 with respect to a radially inner surface 68 of band 56. Surfaces 62 and 68 define a radially outer and radially inner boundary for a flowpath through nozzle assembly 50.

Airfoil vanes 52 are substantially identical and the exemplary nozzle assembly 50 includes a leading airfoil vane 74, a trailing airfoil vane 76, and an inner airfoil vane 78. Each airfoil vane 52 includes a first sidewall 80 and a second sidewall 82. First sidewall 80 is convex and defines a suction side of each airfoil vane 52, and second sidewall 82 is concave and defines a pressure side of each airfoil vane 52. Sidewalls 80 and 82 are joined at a leading edge 84 and at an axially-spaced trailing edge 86 of each airfoil vane 52. More specifically, each airfoil trailing edge 86 is spaced chordwise and downstream from each respective airfoil leading edge 84. First and second sidewalls 80 and 82, respectively, extend longitudinally, or radially outwardly, in span from radially inner band 54 to radially outer band 56 and are separated by a distance 87 such that a throat area 88 is defined between each airfoil vane 74, 76, and 78.

Figure 2:
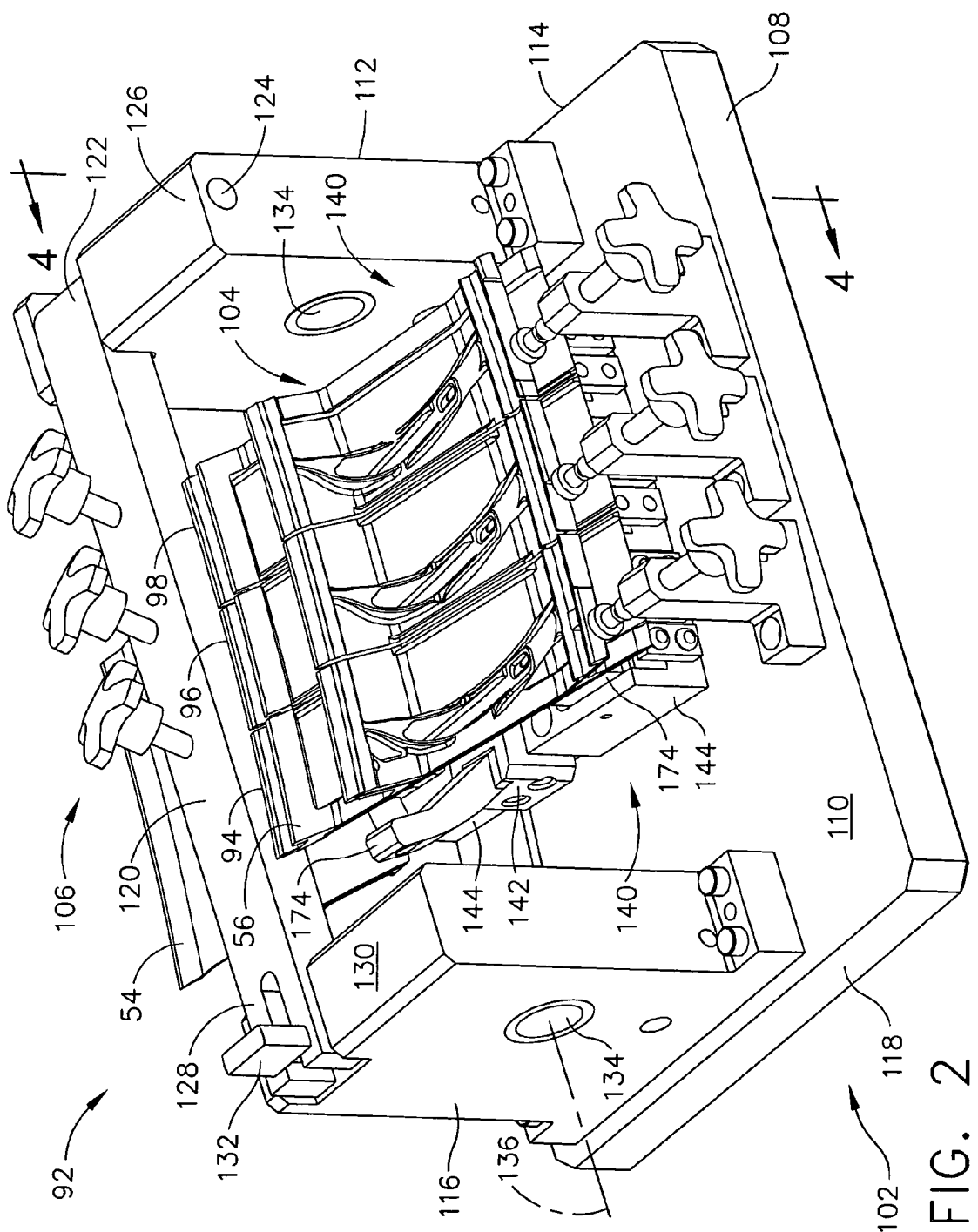
FIG. 2 is a perspective view of a fixture assembly used during fabrication of a turbine nozzle assembly, such as the turbine nozzle assembly shown in FIG. 1
Figure 3:
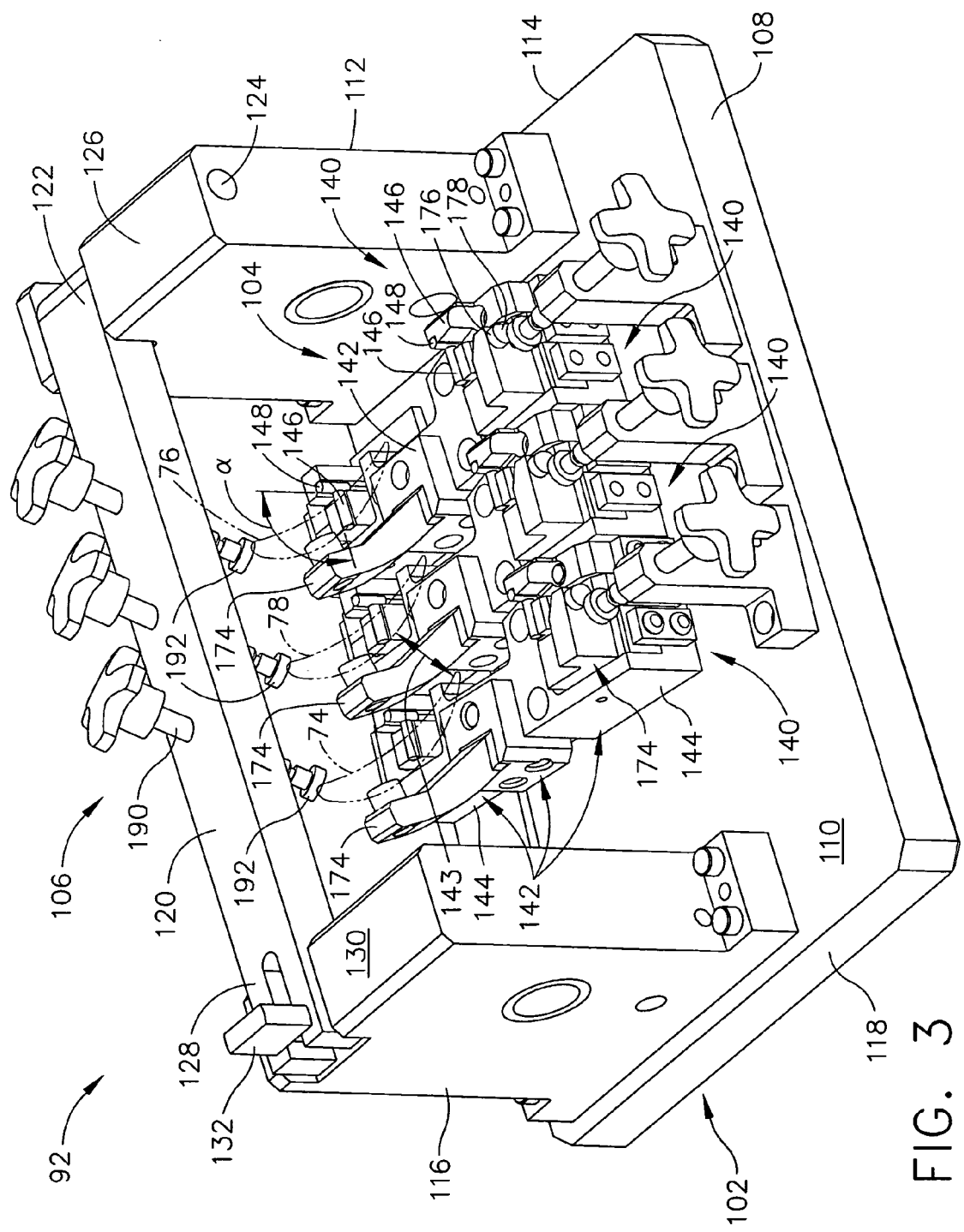
FIG. 3 is a perspective view of the fixture assembly shown in FIG. 2 with the turbine nozzle assembly removed.
Figure 4:
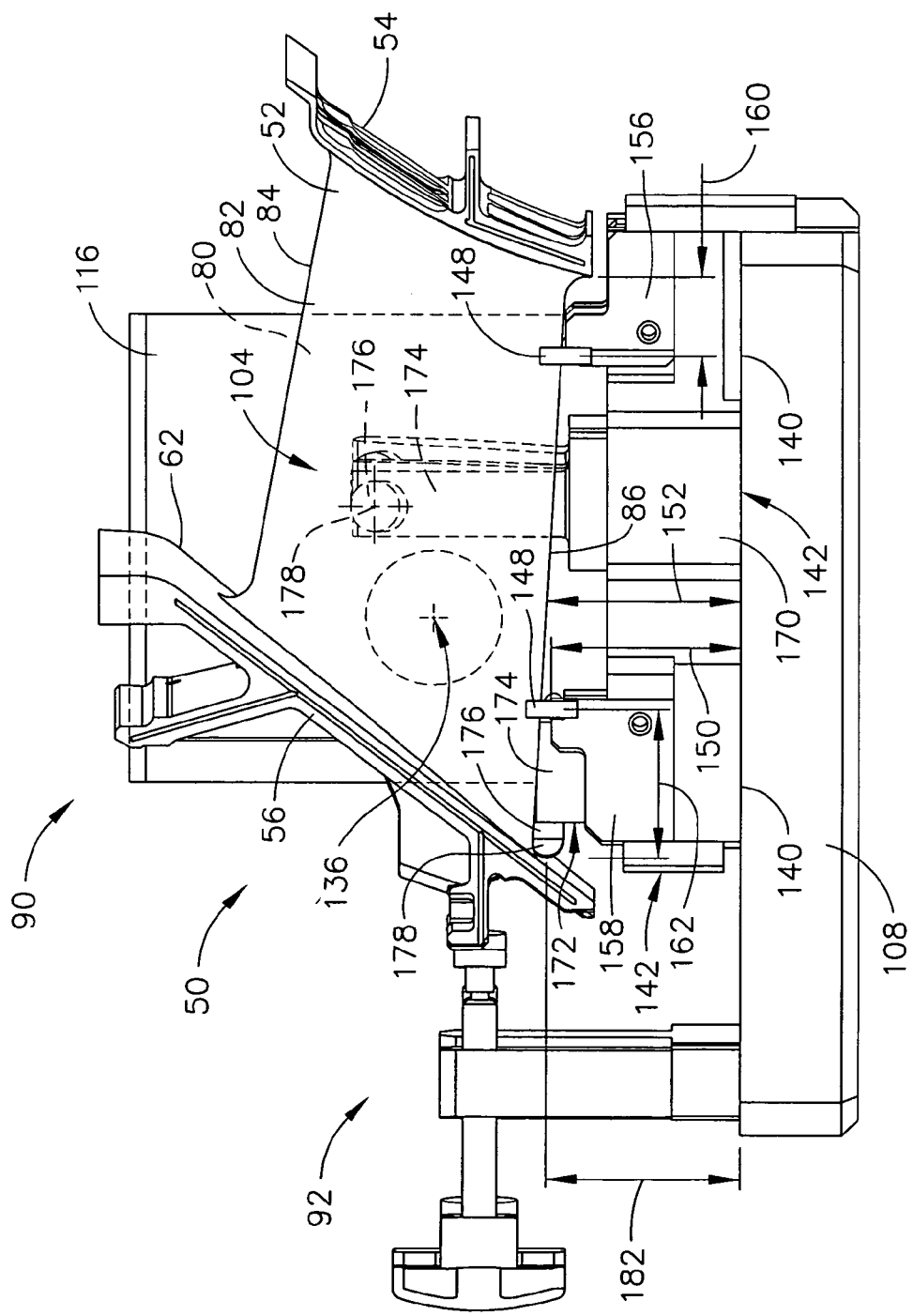
FIG. 4 is a side view of the turbine nozzle assembly shown in FIG. 1 and inserted into the fixture assembly shown in FIG. 2.
Figure 5:
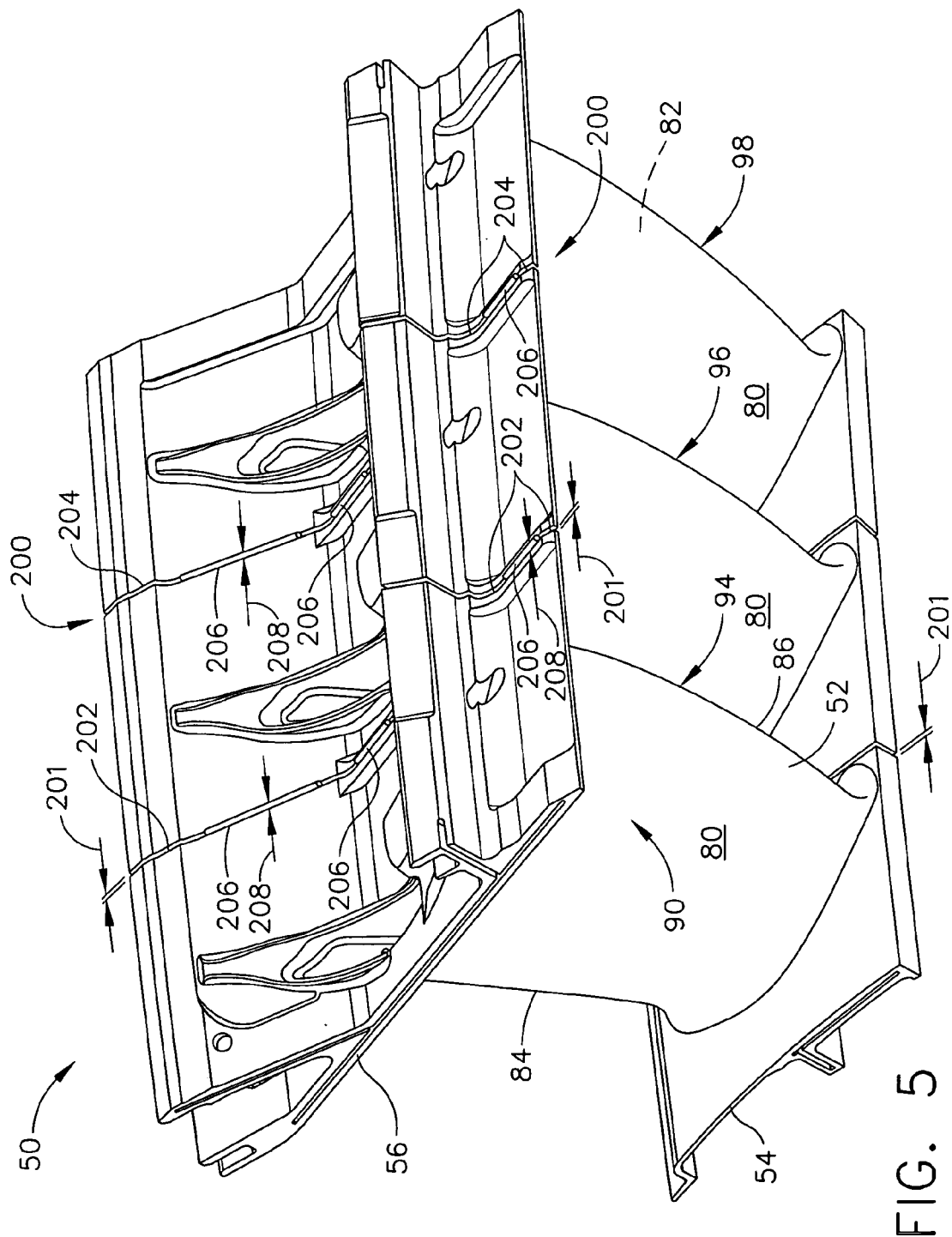
FIG. 5 is a side perspective view of the turbine nozzle assembly shown in FIG. 1 inserted in the fixture assembly of FIG. 2 during fabrication.

FIG. 2 is a perspective view of a fixture assembly 92 used to align and retain turbine nozzle singlets 90 during fabrication of nozzle assembly 50. FIG. 3 is a perspective view of fixture assembly 92 with turbine nozzle assembly 50 removed. FIG. 4 is an side view of turbine nozzle assembly 50 inserted within fixture assembly 92. FIG. 5 is a side perspective view of nozzle assembly 50 inserted in fixture assembly 92 during fabrication. In the exemplary embodiment, singlets 90 are manufactured to form turbine nozzle assembly 50. Specifically, singlets 90 are brazed to one another to form nozzle assembly 50. In the exemplary embodiment, a leading singlet 94, an inner singlet 96, and a trailing singlet 98 are manufactured together to form nozzle assembly 50.

Each singlet 90 includes inner and outer bands 54 and 56, respectively. Each singlet 90 also includes airfoil vane 52 having first sidewall 80, second sidewall 82, leading edge 84 and trailing edge 86. Singlets 90 are loaded, or positioned, into fixture assembly 92 prior to manufacturing.

Fixture assembly 92 includes a fixture 102, a datum system assembly 104, and a plurality of biasing members 106 coupled to fixture 102. Fixture includes a platform 108 having a planar top surface 110, a first extension arm 112 extending from a first end 114 of platform 108, a second extension arm 116 extending from a second end 118 of platform 108, and a beam 120 extending between the first and second arms 112 and 116, respectively. In the exemplary embodiment, a first end 122 of beam 120 is rotatably coupled to a pin 124 extending through a top end 126 of first arm 112. A second end 128 of beam 120 is removably coupled to a top end 130 of second arm 116. A removable pin 132 is removably coupled to second arm 116 and beam 120 to facilitate coupling beam 120 to second arm top end 130. Accordingly, beam 120 can be rotated about first arm top end 126 thereby facilitating providing access for singlets 90 to datum system assembly 104, as described below. Moreover, extension arms 116 and 118 each include a fixture pivot bore 134 for attaching fixture assembly 92 to a pivot member (not shown) such that fixture assembly 92 can pivot about a fixture pivot axis 136 during manufacturing of nozzle assembly 50.

In the exemplary embodiment, datum system assembly 104 facilitates supporting and aligning three singlets 90 for manufacturing. Specifically, datum system assembly 104 facilitates supporting and aligning leading, trailing, and inner airfoil vanes 74, 76, and 78, respectively. Accordingly, datum system assembly 104 includes a plurality of support members 140 and a plurality of locating features 142. In the exemplary embodiment, datum system assembly 104 includes three rows of support members 140 and three rows of locating features 142 which correspond to the three rows of support members 140. In the exemplary embodiment, datum system assembly 104 facilitates orienting airfoil vanes 74, 76 and 78 such that a substantially uniform throat area 88, as shown in FIG. 1, is formed between each of the vanes 74, 76, and 78 for each of the turbine nozzle assemblies 50 that are manufactured using the fixture assembly 92. In the exemplary embodiment, a minimum throat area 143 is the smallest radius from the trailing edge to the convex side of the next airfoil, and fixture assembly 92 facilitates consistently manufacturing substantially identical nozzle assemblies 50 by aligning airfoil vanes 74, 76, and 78 prior to manufacturing.

Each support member 140 includes a base 144 extending from planar top surface 110, a first abutment surface 146 and a second abutment surface 148. Base 144 extends a distance 150 from planar top surface 110 such that a gap 152 is provided between trailing edge 86 and platform 108 when singlet 90 is inserted into datum system assembly 104. First and second abutment surfaces 146 and 148, respectively, are oriented such that first abutment surface 146 is substantially parallel with planar top surface 110, and second abutment surface 146 extends at an angle α from first abutment surface 146. In the exemplary embodiment, angle α is a right angle such that abutment surfaces 146 and 148 form an insert within which airfoil vanes 74, 76, or 78 rest. In an alternative embodiment, angle α is an acute angle such that abutment surfaces 146 and 148 have a V-configuration which facilitates retaining airfoil vanes 52 between the surfaces 146 and 148. In the exemplary embodiment, support member 140 facilitates supporting airfoil trailing edge 86. Specifically, first abutment surface 146 facilitates supporting first sidewall 80 adjacent trailing edge 86, and second abutment surface 148 facilitates supporting and/or retaining second sidewall 82 adjacent trailing edge 86. Accordingly, when airfoil vane 52 is properly inserted and positioned in datum system assembly 104, airfoil trailing edge 86 is supported by first abutment surface 146 and is retained by second abutment surface 148.

In the exemplary embodiment, as shown in FIG. 4, each airfoil vane 52 is supported by an inner support member 156 and an outer support member 158. Inner support member 156 is located a distance 160 from inner band 54. Outer support member 158 is located a distance 162 from outer band 56. The use of a two support member system facilitates providing stability to singlet 90 during the manufacturing process. In an alternative embodiment, more or less than two support members 140 are provided to support each singlet 90.

Locating features 142 include an airfoil locator 170 and a band locator 172 for each singlet 90. Each locating feature 142 includes a riser 174 extending from planar top surface 110 and a location pad 176 extending from riser 174 to contact singlet 90 when singlet 90 is loaded into datum system assembly 104. Location pad 176 includes a curved contacting surface 178 for contacting singlet 90. In an alternative embodiment, contacting surface 178 is flat. In the exemplary embodiment, airfoil locator 170 facilitates locating the corresponding singlet 90 with respect to the adjacent singlets 90, and airfoil locator 170 also facilitates supporting singlet 90 in conjunction with support members 140. Specifically, airfoil locator location pad 176 contacts first sidewall 80 generally equidistantly from leading trailing edges 84 and 86, respectively. In an alternative embodiment, location pad 176 contacts first sidewall 80 near trailing edge 86. In another alternative embodiment, location pad 176 contacts first sidewall 80 near leading edge 84.

In the exemplary embodiment, band locator 172 extends a distance 182 from planar top surface 110 to facilitate contacting inner and/or outer bands 54 and/or 56, respectively. Band locator 172 also facilitates locating the corresponding singlet 90 within fixture assembly 92 with respect to the adjacent singlets 90. Specifically, band locator 172 facilitates aligning inner and outer bands 54 and 56, respectively of adjacent singlets 90 within fixture assembly 92 so that singlets 90 can be manufactured. In the exemplary embodiment, band locator 172 contacts outer band 56. Specifically, band locator locating pad 176 contacts outer band radially inner surface 68. In an alternative embodiment, locating pad 176 contacts inner band 54. In a further alternative embodiment, locating pads 176 are provided for inner band 54 and outer band 56, thereby aligning both bands 54 and 56.

Biasing members 106, shown in FIG. 3, are coupled to fixture 102. Each biasing member 106 includes a body 190 extending from fixture 102 and a contacting surface 192 for interfacing with airfoil vane 52. In the exemplary embodiment, biasing members 106 are coupled to beam 120 and are oriented to contact second sidewall 82 adjacent to leading edge 84. Accordingly, biasing member 106 biases airfoil vane 52 against airfoil locator 170. As such, singlets 90 are secured within fixture assembly 92 and are positioned relative to one another for manufacturing. In the exemplary embodiment, biasing members 106 are adjustable such that, when singlets 90 are positioned within datum system assembly 104, biasing members 106 can be extended until contacting surfaces 192 interface with airfoil vanes 52. In an alternative embodiment, biasing members 106 include a clamp (not shown) that is extendable between a locked and an unlocked position such that when the clamp is in the locked position, contacting surface 192 interfaces with airfoil vane 52.

In the exemplary embodiment, support members 140 and locating features 142 are fixedly coupled to platform to facilitate consistently aligning singlets 90 with respect to fixture 102. Specifically, support members 140 and locating features 142 position singlets 94, 96 and 98 within fixture assembly 92 such that inner band 54 of each singlet 90 is substantially aligned with respect to each other inner band 54 within fixture assembly 92, and outer band 56 of each singlet 90 is substantially aligned with respect to each other outer band 56 within fixture assembly 92. Moreover, support members 140 and locating features 142 are spaced such that a gap 200 having a gap variation width 201, as shown in FIG. 5, is provided between inner bands 54 of adjacent singlets 90 and outer bands 56 of adjacent singlets 90. Gap 200 is the braze gap required between the singlets 90. The gap variation width 201 is the grinding process variance in the angle and braze face joint from the grinding process. Gap variation width 201 is variably selected to facilitate brazing or welding of singlets 90. In one embodiment, gap width 201 is variably selected from a width of approximately 0.001-0.020 inches for manufacturing the singlets 90 together. In another embodiment, gap width 201 is approximately 0.005 inches for manufacturing the singlets 90 together. By this method gap 200 has no impact on minimum throat area 143 between trailing edge 86 and first sidewall 80 such that throat area 88 is substantially uniform between each of the vanes 74, 76, and 78 for each of the turbine nozzle assemblies 50 that are manufactured using the fixture assembly 92. However, in an alternative embodiment, a larger or smaller gap 200 is provided.

As illustrated in FIG. 5, inner bands 54 of leading, inner and trailing singlets 94, 96, 98, respectively, are aligned within fixture 102 prior to manufacturing. Specifically, a first gap 202 is shown between leading and inner singlets 94 and 96, respectively, and a second gap 204 is shown between trailing and inner singlets 98 and 96, respectively.

In the exemplary embodiment, a plurality of wire members 206 extend between respective singlets 90. Wire members 206 have a width 208 that is wider that gap width 200 such that wire members 206 extend beyond gap 200. Wire members 206 are coupled to the respective singlets 90 by a process such as, for example, a welding process. Accordingly, wire members 206 facilitate securing singlets 90 to one another prior to brazing singlets 90 together to form nozzle assembly 50. In the exemplary embodiment, wire member width 208 ranges from approximately 0.025-0.040 inches, wherein 0.030 inches is considered to provide an optimum width 208 for spanning gap 200 and for welding to singlets 90. In the exemplary embodiment, three wire members 206 are utilized to secure outer bands 56 of singlets 90 to each other and three wire members 206 are utilized to secure inner bands 56 of singlets 90 to each other. In an alternative embodiment, more or less wire members 206 are utilized to secure singlets 90 to one another. Moreover, a similar process of welding wire members 206 between singlets 90 is utilized to secure outer bands 56 together. Moreover, in the exemplary embodiment, fixture assembly 92 is pivoted about fixture pivot axis 136 to position the secured singlets 90 prior to welding wire members 206.

Once singlets 90 are secured to one another, turbine nozzle assembly 50 is fabricated by coupling the individual singlets 90 together. Specifically, in the exemplary embodiment, turbine nozzle assembly 50 is fabricated by brazing or welding singlets 90 to one another thereby forming a one piece turbine nozzle assembly 50 having multiple airfoil vanes 52. In the exemplary embodiment, three singlets 90 are fabricated together. In an alternative embodiment, two singlets are fabricated together, forming a doublet.

The above-described turbine nozzle assembly for a gas turbine engine is fabricated in a cost-effective and reliable manner. The turbine nozzle assembly is fabricated from multiple singlets that are oriented within a datum system assembly prior to fabrication. The datum system assembly facilitates positioning the singlets in relation to one another for accurate, precise, and consistent manufacturing of turbine nozzle assemblies. Specifically, the datum system assembly supports the airfoil vane and provides a gap between each of the singlets so that a plurality of wire members can be welded to the singlets to secure the singlets to one another prior to the singlets being fabricated together by a brazing process. Furthermore, because the airfoil vanes are oriented within the datum system assembly, the turbine nozzle assemblies will be manufactured such that the throat areas between the airfoil vanes will be accurately, precisely, and consistently assembled. As a result, the turbine nozzle assemblies facilitate increasing the performance and extending the useful life of the gas turbine engines in a reliable and cost-effective manner.

Exemplary embodiments of fixture assemblies are described above in detail. The assemblies are not limited to the specific embodiments described herein, but rather, components of each assembly may be utilized independently and separately from other components described herein. For example, each fixture assembly component can also be used in combination with other fixture assembly components.

While the invention has been described in terms of various specific embodiments, those skilled in the art will recognize that the invention can be practiced with modification within the spirit and scope of the claims.

What is claimed is:

1. Apparatus for fabricating a turbine nozzle, said apparatus comprises:
   a fixture assembly for aligning a turbine nozzle that includes at least two turbine nozzle singlets that each include an outer band, an inner band, and a vane extending therebetween that includes a first sidewall and a second sidewall coupled together at a leading edge and a trailing edge;
   at least two support members extending from said fixture assembly, each said support member comprising a first abutment surface and a second abutment surface, a first of said at least two support members for contacting at least one of the trailing edge and the leading edge of a first of the turbine nozzle vanes;
   at least two locating features extending from said fixture assembly, a first of said locating features for contacting one of the first sidewall and the second sidewall of the first turbine nozzle vane; and
   at least two biasing members coupled to said fixture assembly, a first of said biasing members for biasing the first turbine nozzle vane against said first locating feature.

2. Apparatus in accordance with claim 1 wherein at least one of said at least two biasing members contacts one of the leading edge and the trailing edge of the first turbine nozzle vane, opposite said first support member.

3. Apparatus in accordance with claim 1 wherein said at least two support members comprise a first support member and a second support member that are oriented such that the trailing edge of the first vane contacts said first and second support members.

4. Apparatus in accordance with claim 1 wherein said first abutment surface and said second abutment surface are oriented to enable the trailing edge of at least one vane to be secured therebetween.

5. Apparatus in accordance with claim 1 wherein said support members and said locating features are configured to substantially align the inner and outer bands of adjacent turbine nozzle singlets within said fixture.

6. Apparatus in accordance with claim 1 wherein said support members and said locating features are configured to substantially align the inner and outer bands of adjacent turbine nozzle singlets within said fixture such that a gap is defined between the inner bands and the outer bands of adjacent singlets.

7. Apparatus in accordance with claim 6 wherein at least one wire extends at least partially across each said gap, said wires are configured to fixedly secure adjacent nozzle singlets.

* * * * *